Feb. 2, 1926.
B. H. SMITH
1,571,912
VOLT-AMPERE METER
Original Filed Feb. 6, 1922
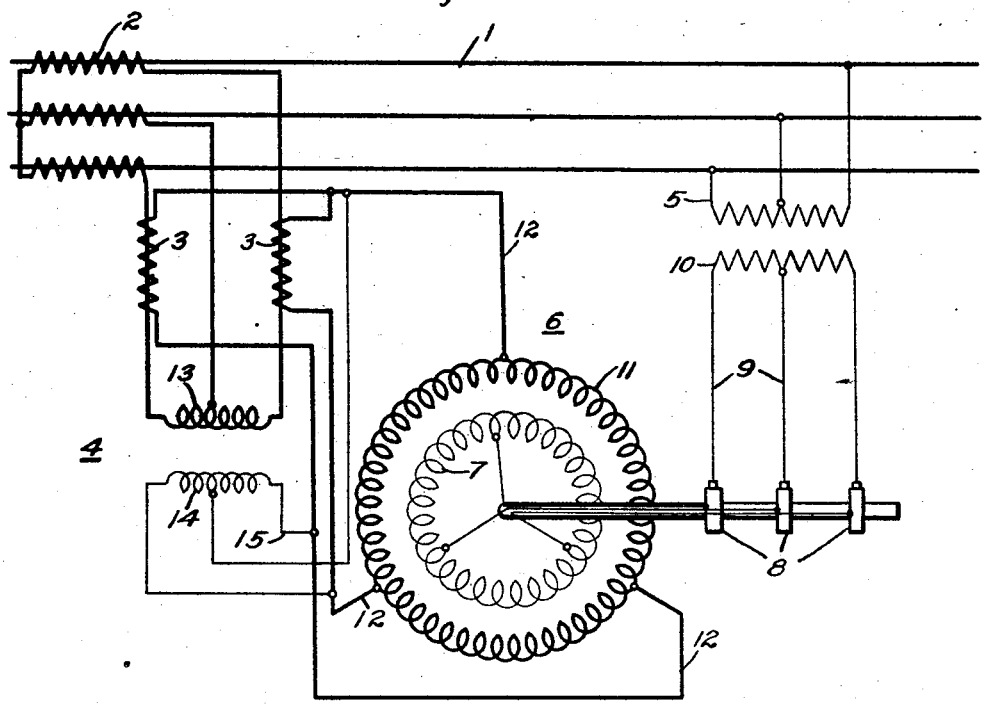
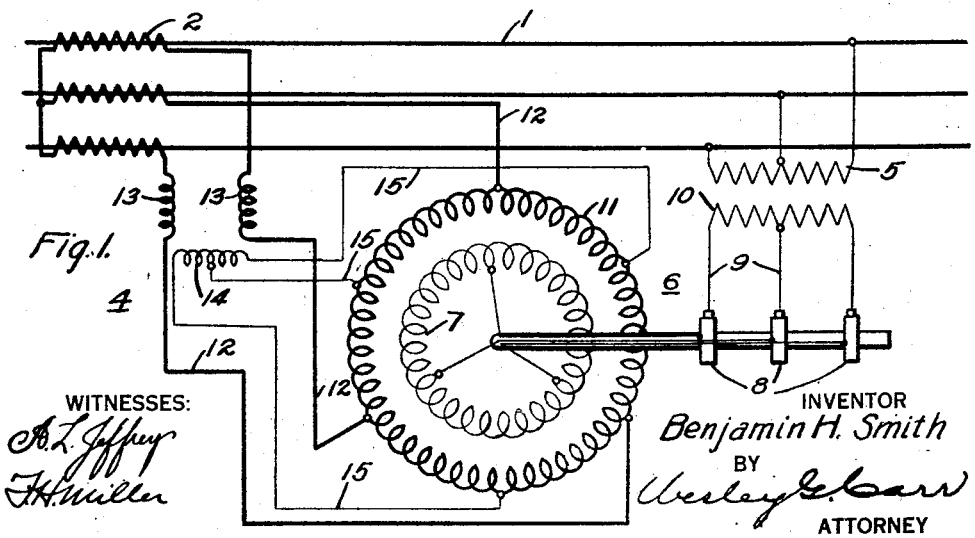
WITNESSES:
INVENTOR
Benjamin H. Smith
BY
ATTORNEY Patented Feb. 2, 1926.

1,571,912

UNITED STATES PATENT OFFICE.

BENJAMIN H. SMITH, OF WILKINSBURG, PENNSYLVANIA, ASSIGNOR TO WESTINGHOUSE ELECTRIC & MANUFACTURING COMPANY, A CORPORATION OF PENNSYLVANIA.

VOLT-AMPERE METER.

Application filed February 6, 1922, Serial No. 534,286. Renewed January 7, 1926.

*To all whom it may concern:*

Be it known that I, BENJAMIN H. SMITH, a citizen of the United States, and a resident of Wilkinsburg, in the county of Allegheny and State of Pennsylvania, have invented a new and useful Improvement in Volt-Ampere Meters, of which the following is a specification.

My invention relates to electrical measuring instruments and particularly to instruments for measuring the volt-amperes of alternating-current circuits.

One object of my invention is to provide an instrument of the above indicated character that shall accurately indicate the volt amperes of a circuit irrespective of changes in the power factor thereof.

Another object of my invention is to provide a volt-ampere-meter device that shall comprise few parts and that shall be compact in construction, economical in manufacture and effective in operation.

Heretofore, means for measuring the volt-amperes of alternating-current circuits have usually been comparatively complicated in that they require relatively large numbers of parts and relatively complicated wiring systems.

In practicing my invention, I provide a single self-contained translating or motor device, similar to an ordinary motor, that may be so wound, or affected by an auxiliary current transformer or transformers, and connected to an ordinary polyphase wattmeter as to cause the latter to effectively measure the volt-amperes of the circuit.

Figure 1 of the accompanying drawings is a diagrammatic view of a device embodying my invention, and Fig. 2 is a similiar view of a modified form of my invention.

As shown in Fig. 1, my invention may comprise, in general, an alternating-current circuit 1, shown as a three-phase circuit but which may suitably be of any number of phases, a main current transformer or transformers 2, a meter 4, similar to an ordinary wattmeter, a voltage transformer 5, and a translating device 6. The device 6 comprises a movable element or winding 7 that is connected, through slip rings 8 and conductors 9, to the secondary widing 10 of the voltage transformer 5. A stationary element or winding 11 is connected, by conductors 12 and through the current coils 13 of the meter 4, to the current transformers 2.

The voltage coil or element 14 of the meter 4 is connected, by conductors 15, to points intermediate the conductors 12 on the winding 11 of the motor 6.

The movable motor element 7 and the stationary element 11 are constructed and related to each other and to the circuit 1 to have fields responsive to the voltage and to the current of the circuit 1, respectively, rotating in the same direction. This construction permits the element 7 to assume a balanced phase relation, or position of no torque, with respect to the stationary winding 11. Thus, if the phase relation between the current and the voltage of the circuit 1 changes in either direction, the element 7 immediately assumes a position of no torque with respect to the winding 11, or a position indicative of the power factor of the circuit 1, and the current in the conductors 15 is so affected, as to, at the same time, be in phase with the voltage of the circuit 1.

Since the current element 13 of the meter 4 is energized in accordance with the current of the circuit 1, and the voltage element 14 thereof is energized in definite phase relationship to the current traversing the winding 13, the meter 4 will, at all times, accurately measure the volt-amperes, irrespective of the power factor of the circuit 1.

In the form of my invention shown in Fig. 1, by reason of the widely different values of current normally supplied by the transformers 2 and 5, the ampere turns of the windings 7 and 11 are rendered more nearly equal by increasing the number of turns of the conductor in the winding 11. This construction causes the current and voltage elements 13 and 14, respectively, of the meter 4, to be supplied with currents more nearly of the same order, to ensure effective operation In the form of my invention shown in Fig. 2, in which similar parts are designated by similar reference characters, the construction is substantially the same as that above described, with the exception that the ampere turns of the elements 7 and 11 are rendered more nearly equal by means of an auxiliary step-up current transformer or transformers 3, in the secondary circuit of the main current transformer 2. This permits of the use of a relatively high-voltage winding 14, whereas the winding 14 of the device shown in Fig. 1 is a relatively low-voltage winding. In other words, by the use of the step-up transformers 3, a standard wattmeter 4 may be used. The winding 14 of the device shown in Fig. 1 must, of necessity, be special, as it has impressed thereon relatively low voltage. In this form of my invention, the current elements 13 of the meter 4 are connected in star, relative to each other, and in direct connection to the conductors 12 instead of through the transformers 3, which are omitted.

While I have shown and described particular forms of my invention, changes and modifications may be made therein without departing from the spirit and scope of my invention, and such modifications are intended to be covered by the appended claims.

What I claim as my invention is:

1. In an alternating-current circuit, the combination with a meter, of a translating device having only one current element and only one voltage element, said elements being automatically relatively adjustable in accordance with power-factor changes in the circuit and co-operating with each other only for supplying current to the meter.

2. In an alternating-current circuit, the combination with a meter having a current element energized in accordance with the current of the circuit and a voltage element, of a translating device having only one current element and only one voltage element, said elements being automatically relatively adjustable in accordance with power-factor changes in the circuit and co-operating with each other only for energizing the meter voltage element.

3. In an alternating-current circuit, the combination with a meter having a current element energized in accordance with the current of the circuit and a voltage element, of a translating device, for transmitting current to the voltage element comprising a winding directly responsive to the current and inductively responsive to the voltage of the circuit.

4. In an alternating-current circuit, the combination with a meter having a current element energized in accordance with the current of the circuit and a voltage element, of a translating device for transmitting current to the voltage element comprising windings, one of which is directly responsive to the current of the circuit and is connected to said voltage element and the other of which is responsive to the voltage of the circuit and is inductively related to the current winding.

5. In an alternating-current circuit, the combination with a meter comprising co-operating elements, one of which is directly connected to the circuit, of a translating device comprising inductively related relatively movable current and voltage elements, one of which is directly connected to the other meter element.

6. In an alternating-current circuit, the combination with a meter, of a translating device including only two inductively related windings, said windings being relatively movable by the inductive effort thereof in accordance with power-factor changes in the circuit for supplying current to the meter.

7. In an alternating-current circuit, the combination with current and voltage transformers, and a meter having current and voltage coils, of a translating device having a movable winding connected to the voltage transformer and a stationary winding energized from the current transformer, said windings being related to cause rotating fields in the same direction and said meter voltage coil being connected to said stationary winding.

8. The combination with a meter having current and voltage coils, of a translating device having a winding energized in accordance with the voltage of a circuit and a secondary winding energized in accordance with the current of said circuit, said windings being related to cause rotating fields in the same direction and said meter voltage coil being connected to said second winding.

9. In an alternating-current circuit, the combination with a meter comprising co-operating current and voltage windings one of which is directly energized from the circuit, of a translating device comprising inductively related current and voltage elements relatively movable in response to power-factor changes and one of which is directly connected to the other meter winding.

In testimony whereof, I have hereunto subscribed my name this 26th day of January 1922.

BENJAMIN H. SMITH.